United States Patent
Chevreau et al.

(10) Patent No.: US 10,050,380 B2
(45) Date of Patent: Aug. 14, 2018

(54) LOCKING DEVICE FOR ELECTRIC CONNECTORS AND ELECTRIC CONNECTORS EQUIPPED WITH THE DEVICE

(71) Applicant: EAXTRON (SARL), Paris (FR)

(72) Inventors: Mathieu Chevreau, Tours (FR); Marnix Van Der Mee, Montlouis sur Lorie (FR)

(73) Assignee: EAXTRON (SARL), Paris (FR)

( * ) Notice: Subject to any disclaimer, the term of this patent is extended or adjusted under 35 U.S.C. 154(b) by 0 days.

(21) Appl. No.: 15/479,481

(22) Filed: Apr. 5, 2017

(65) Prior Publication Data

US 2017/0324192 A1   Nov. 9, 2017

(30) Foreign Application Priority Data

May 3, 2016   (FR) ...................... 16 54009

(51) Int. Cl.
*H01R 13/627*   (2006.01)
*H01R 13/633*   (2006.01)

(52) U.S. Cl.
CPC ..... *H01R 13/6275* (2013.01); *H01R 13/6335* (2013.01)

(58) Field of Classification Search
CPC .............. H01R 13/639; H01R 13/6275; H01R 13/6272; H01R 13/641; H01R 12/716; H01R 13/633; H01R 2107/00; H01R 2201/26; H01R 24/60; H01R 13/6271; H01R 13/502; H01R 13/6273; H01R 12/707; H01R 12/721
See application file for complete search history.

(56) References Cited

U.S. PATENT DOCUMENTS

| | | |
|---|---|---|
| 4,288,142 A | 9/1981 | Anderton |
| 5,487,678 A | 1/1996 | Tsuji et al. |
| 5,993,238 A * | 11/1999 | Kudo ................. H01R 13/6272 |
| | | 439/352 |

(Continued)

FOREIGN PATENT DOCUMENTS

| | | |
|---|---|---|
| EP | 0354582 A2 | 2/1990 |
| EP | 1049212 A1 | 11/2000 |
| EP | 1065756 A2 | 1/2001 |

OTHER PUBLICATIONS

Extended European Search Report issued by the European Patent Office on a co-pending European patent application, corresponding to the current U.S. patent application.

(Continued)

*Primary Examiner* — Truc Nguyen
(74) *Attorney, Agent, or Firm* — Egbert Law Offices, PLLC (57) ABSTRACT

Disclosed are a locking device and an assembly of conjugated electric connectors equipped with the locking device. The device includes: at least one latch presenting a first locking relief, at least one bolt that can be inserted into the latch, and a flexible tongue received in a casing of the bold, the tongue being provided with a second locking relief forming a fitting with the first locking relief. Application includes the implementation of connectors and in particular of high-power connectors for vehicles and electric pieces of equipment.

11 Claims, 9 Drawing Sheets

(56) References Cited

U.S. PATENT DOCUMENTS

| | | | | |
|---|---|---|---|---|
| 6,231,398 B1* | 5/2001 | Furutani | ............... | H01R 13/506 |
| | | | | 439/701 |
| 2013/0029516 A1* | 1/2013 | Miyawaki | ........... | H01R 13/6272 |
| | | | | 439/352 |
| 2013/0059481 A1* | 3/2013 | Neumeuer | ............ | H01R 13/432 |
| | | | | 439/676 |
| 2014/0017927 A1* | 1/2014 | Kida | ..................... | H01R 13/506 |
| | | | | 439/350 |
| 2014/0065872 A1* | 3/2014 | Yamada | ................ | H01R 13/625 |
| | | | | 439/357 |
| 2015/0333431 A1* | 11/2015 | Gerwatowski | .......... | H01R 13/44 |
| | | | | 439/141 |
| 2015/0372419 A1* | 12/2015 | Toyoda | ............... | H01R 13/6272 |
| | | | | 439/345 |
| 2016/0156130 A1* | 6/2016 | Sekino | ............. | H01R 13/62933 |
| | | | | 439/345 |

OTHER PUBLICATIONS

Search Report issued by the French Patent Office in connection with French priority application No. 16/54009.

* cited by examiner

LOCKING DEVICE FOR ELECTRIC CONNECTORS AND ELECTRIC CONNECTORS EQUIPPED WITH THE DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a locking device for electric connectors, as well as electric connectors equipped with the locking device.

Electric connector means an apparatus for electric connection of one electric equipment to another electric equipment provided with a complementary connector, while offering the possibility of subsequent separation. Electric connectors may usually present themselves as a couple of connectors of the plug and socket type, of plug and outlet, or also in a more general way, with conjugated elements of electric contact. Such connectors are usable notably for connecting electrical cable conductors. The connectors may also present themselves as a coupling formed by a free connector connected to an electric cable for example, and a connector forming a fixed base or having a base plate integrated into an equipment or installation.

The invention finds applications in the technical field of electric connectors, and in particular for high power connectors.

Power connectors are connectors dimensioned for the transmission of currents with an intensity greater than 100 A.

The invention can be applied in particular for connectors intended for connecting electric vehicles to an energy source, such as a power supply battery or to connect a power supply battery of these vehicles to a charging station. The invention can notably be applied to electric forklifts.

2. Description of Related Art Including Information Disclosed Under 37 CFR 1.97 and 37 CFR 1.98

The document EP 0 354 582 provides an illustration of an assembly of electric connectors of a type capable to be equipped with a locking device conforming to the invention.

One is also familiar with electric connectors provided with a locking mechanism, and in particular with a locking mechanism between the connector casings.

By resorting to a locking mechanism one intends essentially to avoid an accidental disengagement of the connectors, notably under the effect of some pulling action exerted on an electric cable to which they are connected.

Such locking mechanisms exist for low current connectors, such as, for example, the connectors for signal transfer for computer equipment, but also for higher current connectors.

One may refer to document EP1 049 212 on this subject which concerns a connector provided with a bayonet lock.

BRIEF SUMMARY OF THE INVENTION

Within the framework of the invention a certain number of difficulties have been pointed out with respect to locking connectors.

These difficulties can be summed up as follows:

A certain number of locking connectors are complex or tedious to connect or disconnect, or require specific tooling for manipulating the lock.

A certain number of locking connectors have a time requirement for disengaging the lock that is hardly compatible with an emergency separation of the connectors.

A certain number of locking connectors present the risk that an operator might grasp the casing of the connectors in proximity of live conductors while disengaging the lock or separating the connectors.

In view of the difficulties above, the invention aims to propose an improved connector locking device and an assembly of connectors presenting notably one or several of the following advantages:

Ease of engagement and disengagement of the lock,
Reliability of the connection and the lock,
Possibility of quick one-handed release,
Possibility of adapting the lock to existing connectors,
Interchangeability of the locking device,
Low production cost.

To achieve these aims, the invention proposes in particular a locking device intended for an assembly of electric connectors including at least a first and a second conjugated connector that can be coupled together. The locking device includes:

at least one latch capable of being rigidly made integral with the first connector, the latch presenting a passage for a bolt, and in the bolt passage a first locking relief, at least one bolt susceptible of being rigidly made integral with the second connector, the bolt presenting a section adjusted to the passage of the latch bolt, for an introduction of the bolt into the latch parallel to a bolt axis, and a tongue, received in a bolt housing, the tongue extending in parallel to the axis of the bolt, and being configured to be introduced in the latch jointly with the bolt, the tongue being provided with a second locking relief and the tongue presenting sufficient flexibility for a displacement of the second locking relief between a protruding position on a bolt face turned towards the first locking relief during an introduction of the bolt into the latch, and a retracted position in the housing of the bolt, the second locking relief being configured for a passage along the first locking relief in the retracted position during the introduction of the bolt in the latch, and to occupy the protruding position behind the first locking relief in a direction of insertion of the bolt into the latch, when the bolt occupies a locking position in the latch.

In the locking position the first and second locking reliefs form a slip-fit that resists the withdrawal of the bolt from the latch.

Conjugated connectors are understood to mean connectors presenting complementary elements of electrical male and female connection and which can be reunited by mutual insertion of at least one part of the connectors. By extension, one also considers as conjugated connectors those connectors which present casings with complementary male and female parts which can be inserted one into the other or be joined together by slip fit, or more generally by complementary shapes.

The "latch" of the locking mechanism is so called as it can notably be configured as a housing accepting a male part of the locking device designated by the bolt. It must nevertheless be noted that during the locking action, the latch and the bolt cooperate to prevent any dislocation of the bolt parallel to its axis instead of perpendicular to its axis as in a traditional lock. The latch presents a passage for the bolt. Nevertheless, and as this is mentioned again further down in the description, it is not indispensable that the latch completely surround the end of the bolt when the bolt is introduced into the latch. In fact, it suffices that the latch and the end of the bolt present complementary shapes that can ensure proper interaction between the locking reliefs to retain the bolt in the latch, in a locked position. Adjustment of the cross-section of the bolt to the bolt passage of the latch is understood in this sense.

Flexibility of the tongue allows retraction of the second locking relief so as to be essentially perpendicular to the axis of the bolt. It takes place in the bolt housing which receives the tongue. Retraction of the second relief allows its passage above the first relief of the latch when the bolt is introduced into the latch. When the bolt is introduced parallel to the axis of the bolt, the second relief places itself behind the first relief relative to the direction of introduction of the bolt into the latch, and resumes its protruding position by a self-lifting effect of the flexible blade. An interlock of the second relief behind the first locking relief gives rise, between the first and the second locking relief, to an interaction preventing the withdrawal of the bolt from the latch. This interaction is an interaction by complementarity of shape.

In the absence of supplementary characteristics, the interlock can be provided as an irreversible interlock.

However, and preferably for power connectors, the interlock can be provided as a reversible interlock described below.

In effect, and in a preferred implementation of the device, the tongue and the bolt can be provided with conjugated support edges, the tongue then presenting freedom of translateral movement in the casing of the bolt, parallel to the axis of the bolt, between:
  a proximal position, in which the conjugated support edges are in contact, and in which the conjugated support edges inhibit bending of the tongue with a displacement of the second locking relief from the protruding position towards the retracted position, and
  a distal position, in which the conjugated support edges are separated, to allow displacement of the second locking relief from the protruding position towards the retracted position, by bending of the tongue.

The tongue can slide in the housing of the bolt between the proximal position and the distal position.

In the proximal position, the displacement of the second locking relief is inhibited which permits, when the bolt is engaged in the locking position, to maintain the interlocking of the locking reliefs and to guarantee their interaction which prevents retraction of the bolt from the latch.

In the distal position, the conjugated support edges of the tongue and the bolt are sufficiently distant to allow bending of the tongue and retraction of the second locking relief. Withdrawal of the bolt from the latch is now possible.

One may accessorily note that the displacement of the tongue relative to the bolt between its proximal position and its distal position is possible, whether the bolt is engaged in the latch or not.

According to an interesting implementation of the device, the proximal position of the tongue can be enabled closer to a free end of the bolt than the distal position of the tongue. The result of this particularity is that the blocking of the tongue and of the locking relief occurs automatically when the bolt is introduced into the latch. Inversely, the release of the tongue and of its locking relief can be made in the same direction as that of a retraction of the bolt in the latch. This particularity allows intuitive utilization of the lock when it is associated with a connector.

The locking device can include at least one return spring of the tongue in the proximal position.

When the bolt is not yet engaged, a first interaction between the locking reliefs allows pushing back the tongue into its distal position against the spring return force of the return spring. The tongue is pushed back by the force of engagement of the bolt or of the connector which is part of. The displacement of the second locking relief from its protruding position towards the retracted position is now unblocked and insertion of the bolt is possible.

During an effort of withdrawing the bolt or connector it is part of, the action of the conjugated support edges opposes itself to the displacement of the tongue and the second locking relief in the manner already described.

Thus, the locking device can further include a grip that is integral to the tongue and manually operable to move the tongue from the proximal position to the distal position and to release it.

The grip can also present a median pulling axis forming with the axis of the bolt an angle preferably between 0 and 20 degrees. The slight angle between the grip and the bolt allows for the intuitive use of the grip to move the tongue towards the distal position and withdraw the bolt from the latch. When the locking device is integral with a connector, the same grip can also be used to separate the connector from a conjugated firmly held connector.

This possibility of implementation of the locking device is particularly advantageous to the extent that a single pull on the grip is enough to release the lock and to separate the connector from the conjugated connector. As indicated above, one pull on the housing of the connector without operating the grip does not allow releasing the connector to the extent that the tongue remains in its proximal position and the second locking relief is maintained in its protruding position inhibiting the withdrawal of the bolt.

According to another particularity of the locking device, at least one of the first locking relief or the second locking relief can present at least one incline configured to cooperate with the other of the first locking relief and of the second locking relief, to push the second locking relief from the protruding position towards the retracted position during an introduction of the bolt into the latch or during a retraction of the bolt from the latch.

This particularity allows automatic operation of the locking relief at the time of insertion of the bolt or of its retraction from the latch.

The invention also concerns an assembly of connectors including at least one first and at least one second conjugated connector, and a locking device as described above, in which the latch is rigidly integral with at least one of the first and second connectors and in which the bolt is rigidly integral with the other of the first and the second connector.

It must be emphasized that the fact that the bolt is fixed to one connector is not detrimental to the displacement relative of the tongue between its proximal and distal positions mentioned previously.

The first and the second connector of the assembly of connectors may feature casings made of an electrical insulating material, each housing at least one element of electric contact. The casings and/or electric contact elements of the first and of the second connector present a complementarity of shape permitting mutual insertion. Likewise, the bolt and the latch are integral with the casings and configured for insertion of the bolt in the latch, or for removal of the bolt from the latch respectively, simultaneously with the mutual insertion, or of a withdrawal respectively, from the contact elements and/or the casings.

Mutual insertion of the contact elements is understood to be a total or partial insertion of a contact element in a conjugated contact element, for example a pin into a socket or into a conductor sleeve. The mutual insertion of the casings is understood to be an insertion of a male part of a connector casing into a corresponding female part of a conjugated connector casing. The bolt and the latch are so positioned that their insertion or their withdrawal goes hand in hand with the casings and/or contact elements.

In other respects, and preferably, the bolt and the latch, and in particular the previously mentioned locking elements, are configured to give rise to a corresponding locking of the bolt in the latch when a mutual insertion of the casings or the contact elements is sufficient to ensure electrical continuity between the contact elements of the conjugated connectors.

The bolt can be made integral with the casing of either the first or the second connector by screwing and/or complementarity of shape.

The latch can be made integral with the other connector by irreversible slip fitting or also by screws.

Other characteristics and advantages of the invention become clear from the following description in reference to the figures of the drawings. This description is given for illustrative purposes and not limiting.

DETAILED DESCRIPTION OF THE INVENTION

In the following description, identical or similar parts of the various figures are indicated by the same numerical references, so as to facilitate the transfer of one figure to the other. In other respects, the various figures are free-scaled.

Figure 1A:
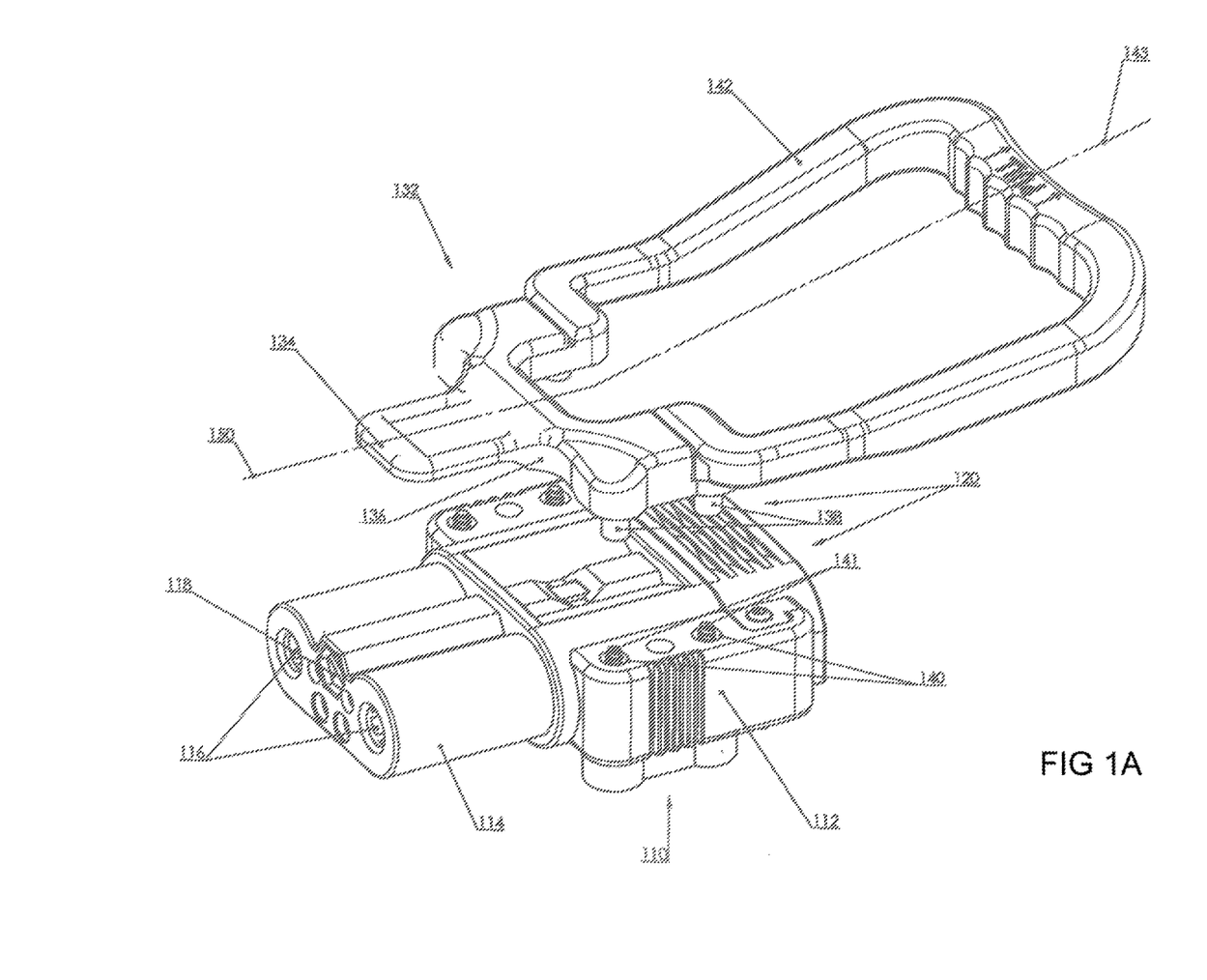
FIG. 1A is a perspective view of a connector with male casing and a first part of the locking device provided with a bolt and a grip, and meant to be mounted on the connector with male casing.

FIG. 1A shows a first connector 110 including a male casing 112. The male casing 112 presents a male insertion part 114 which houses female contact elements 116 in the form of sockets or sleeves. The female contact elements 116 are susceptible to receive conjugated male contact elements such as pins, not visible on the figure. The male insertion part 114 presents also a positioning member 118 configured for selective compatibility with the female casings, notably in terms of voltage and/or current. The male casing is made of an electrically insulating material, for example of plastic material, so it can be grasped by an operator.

In contrast to the male insertion part 114, the first connector 110 presents passages 120 for electric cables, not shown.

A first part 132 of the locking mechanism is represented as detached from the first connector 110 so as to show its removable character. The first part 132 of the locking mechanism also features a male part in the form of a bolt 134. The bolt 134 is integral with a base element 136 which allows fastening the first part 132 of the locking mechanism on a connector housing. The base element 136 presents centering blocks 138, susceptible of cooperating with corresponding indentations 140 of the male casing 112. Screws 141 going through the indentations 140 of the male casing are provided for joining the base element 136 with the male casing 112.

The first part 132 of the locking mechanism also presents a grip 142 extending opposite the bolt 134. One can observe that a median axis of traction 143 of the grip 142 forms a small angle, in the range of 0 to 20 degrees, with an axis 150 of the bolt 134. The axis 150 of the bolt passes through the bolt and is located in a symmetric plane of the first part 132 of the locking mechanism.

Figure 1B:
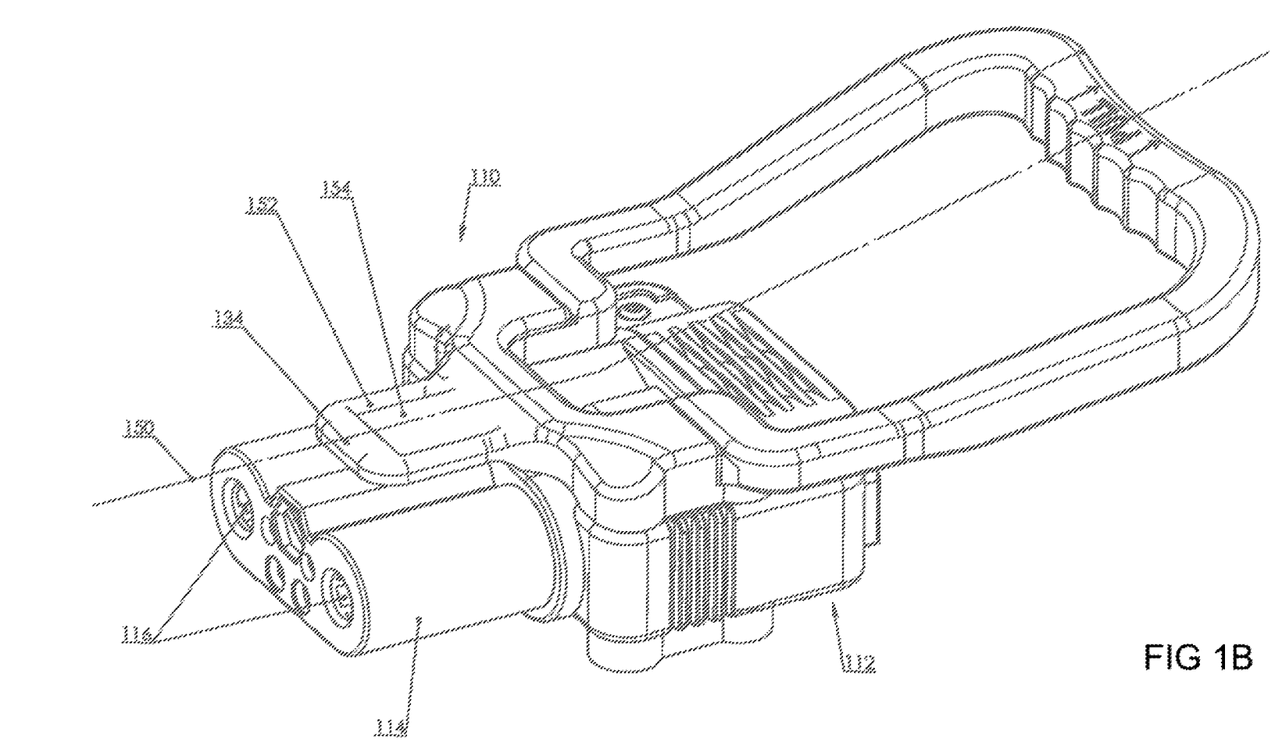
FIG. 1B is a perspective view of the connector of FIG. 1A with the first part of the locking device mounted on the connector.

FIG. 1B shows a first connector 110 and the first part 132 of the locking mechanism assembled and rigidly integral with each other. The axis 150 of the bolt is located in a symmetric plane of the first connector and extends parallel to the axes of female contact elements 116 of the first connector 110.

The bolt 134 extends along the male insertion part 114 of the male casing 112. It presents a flattened shape essentially perpendicular to the symmetric plane of the first connector.

One is also able to observe that the bolt 134 presents a hollow central part forming a housing 152 and receiving a tongue 154.

Figure 2A:
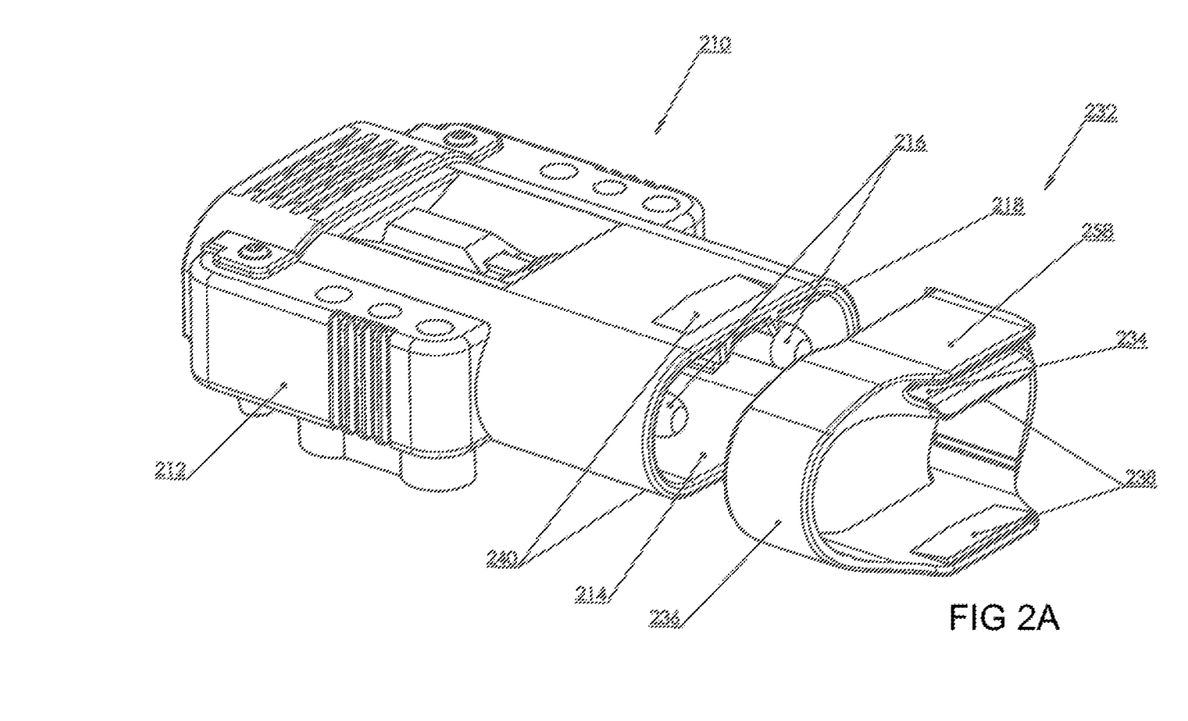
FIG. 2A is a perspective view of a connector with female casing and a second part of a locking device provided with a latch, and meant to be mounted on the connector with female casing.

FIG. 2A shows a second connector 210, conjugated to the first connector of FIG. 1A, and including a female casing 212. The female casing 212 presents a female insertion part 214 which houses male contact elements 216 in the form of pins. The female insertion part presents complementarity of shape with the male insertion part of the male casing of FIGS. 1A and 1B, for mutual insertion of the casings and the contact elements. The female insertion part 214 also presents a positioning member 218 configured as conjugated to the positioning member of the male insertion part of the first connector.

FIG. 2A also shows a second part 232 of the locking mechanism provided with a latch 234. The latch 234 is integral with a ring 236 sized so it can slide over an outside wall of the female insertion part 214 of the second connector 210 so as to fasten to it the latch 234. The fastening ring 236 presents pads 238, only one of which is visible on FIG. 2A. The pads 238 are configured to work together with the corresponding depressed indentations 240 in the wall of the female casing 212 so as to produce an irreversible fitting. The irreversible fitting makes the ring 236 and thus the latch rigidly integral with the female casing. According to another possibility, not shown, the second part 232 of the locking mechanism can also be screwed to the female casing 212.

Figure 2B:
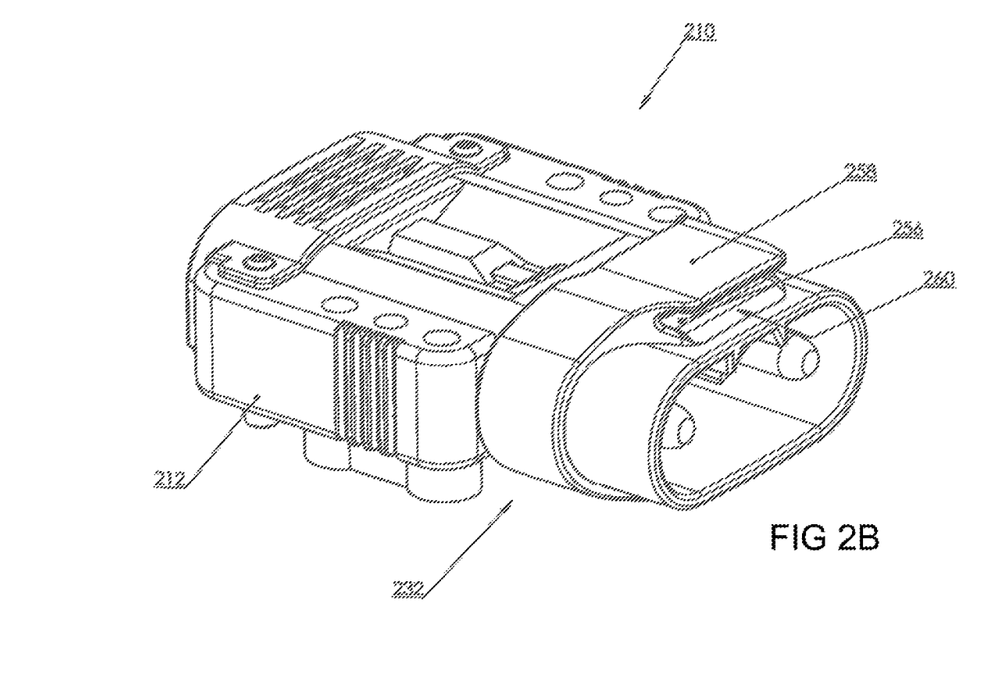
FIG. 2B is a perspective view of the connector of FIG. 2A with the second part of the locking device mounted on the connector with female casing.

FIG. 2B shows the second part 232 of the locking mechanism in place on the female casing 212 of the second connector 210. One is able to observe that the latch presents a first relief 256 next to one end of the female insertion part. The latch also presents a pontoon 258 linking lateral walls of the latch. The pontoon 258 extends essentially parallel to the first relief 256. Between the first relief and the pontoon a passage 260 is provided to receive the bolt of the first connector described in reference to FIGS. 1A and 1B.

Figure 3:
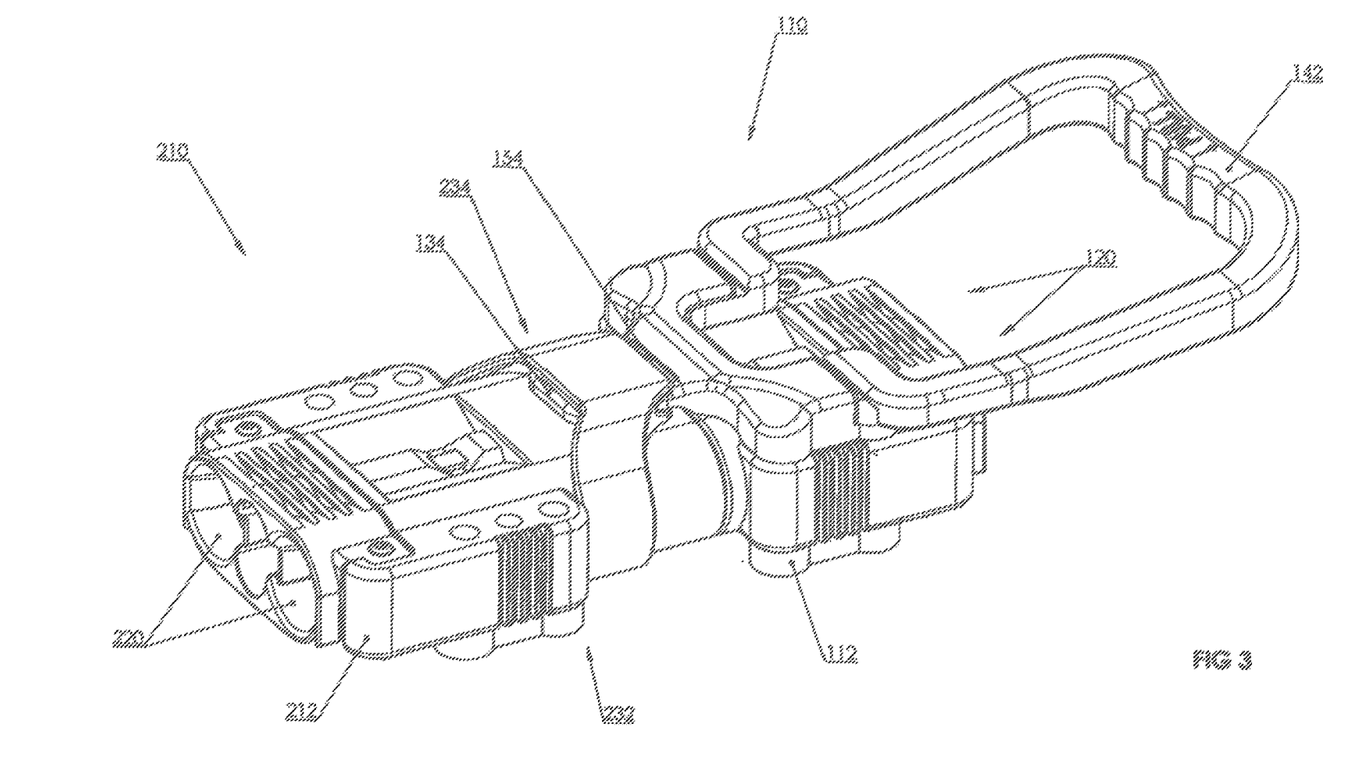
FIG. 3 shows in perspective the connectors of FIGS. 1B and 2B, mutually inserted, and the locking device in locked position.

FIG. 3 shows the first and the second connector 110, 210 assembled. The male insertion part of the male casing 112 is completely received in the female insertion part of the female casing 212 and the bolt 134 is received in the latch 234. One is able to observe on the female casing 212 of the second connector 210, passages 220 for electric cables. The electrical cables are not shown.

Figure 4:
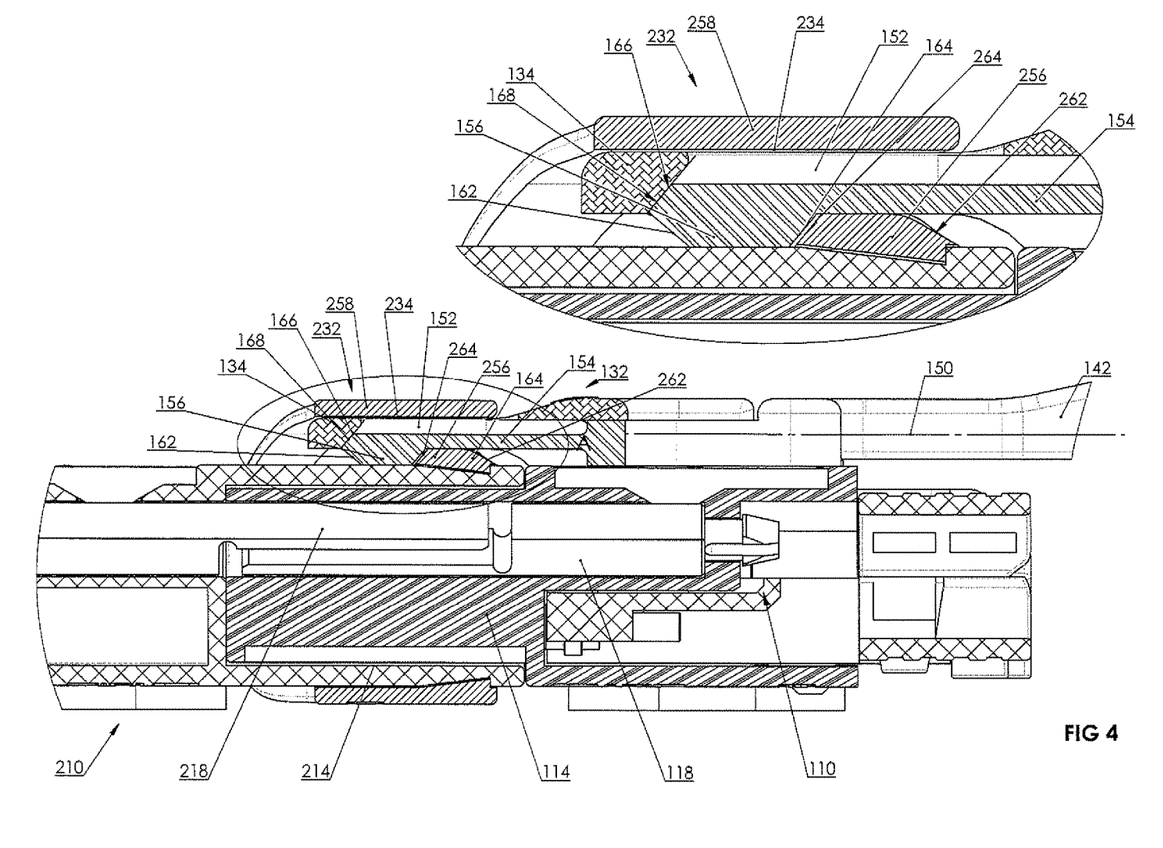
FIG. 4 is a center-line cross section of a part of the connectors and of the locking device of FIG. 3.

FIG. 4 shows in a cross-section along a median plane, the first and the second connectors 110 and 210 assembled with the locking device 132, 232 in locked position. The male insertion part 114 of the male casing, on the right of the figure, is completely inserted in the female insertion part 214 of the female casing on the left of the figure. The male and female contact elements are not visible on FIG. 3 because they are positioned on either side of the cross-section plane. The cross-section plane passes through the positioning members 118, 218.

One is able to observe that, conjointly with the mutual insertion of the male and female insertion parts of the connectors, the bolt 134 seats itself in an adjusted manner in the latch 234. Inside the latch 234, a free end of the bolt 134 comes to rest against the pontoon 258 of the latch 234. One is also able to observe that the tongue 154 of the bolt presents a second locking relief 156 which, in the locked position, is seated behind the first locking relief 256 of the latch 234. The second locking relief 156 is located on one side of the first locking relief 256, opposite the free end of the second connector 210. At the time of insertion of the bolt 134 in the latch 234, the tongue is slightly bent towards the inside of the seat 152 of the bolt. The bending of the tongue is accompanied by a displacement of the second locking relief 156 perpendicular to the axis 150 of the bolt and allows its passage along the first locking relief 256. When the insertion is complete, the second locking relief 156 inserts itself behind the first relief 256 in its protruding position, under the effect of a spring force exerted by the tongue 154.

Edges 162, 262 of the locking reliefs present a wedge shape. At the time of insertion of the bolt 134 in the latch 234, the wedges constitute inclines which come into contact and which facilitate the displacement of the second locking relief 156 from its protruding position to its retracted position in the casing of the bolt.

FIG. 4 shows the locking device in locked position. In this position, tension on the male and female casings 112, 212 does not permit separation of the connectors 110, 120. Interaction between the edges 164, 264 with respect to the first locking relief 256 and to the second locking relief 156 prevents any movement of the bolt 134 trying to extract it from the latch along its axis.

Furthermore, an interaction between a supporting edge 166 of the end of the tongue 154 with a conjugated supporting edge 168 of the bolt prevents any new bending of the tongue and hence any new passage of the second locking relief 156 above the first locking relief, in a direction of extraction of the bolt.

A separation of the first and of the second connector is possible only by exercising a pulling action on the grip 142 of the first connector, the second connector being kept fixed. Release of the lock through pulling on the grip is better understood by referring to FIGS. 5 and 6.

Figure 5:
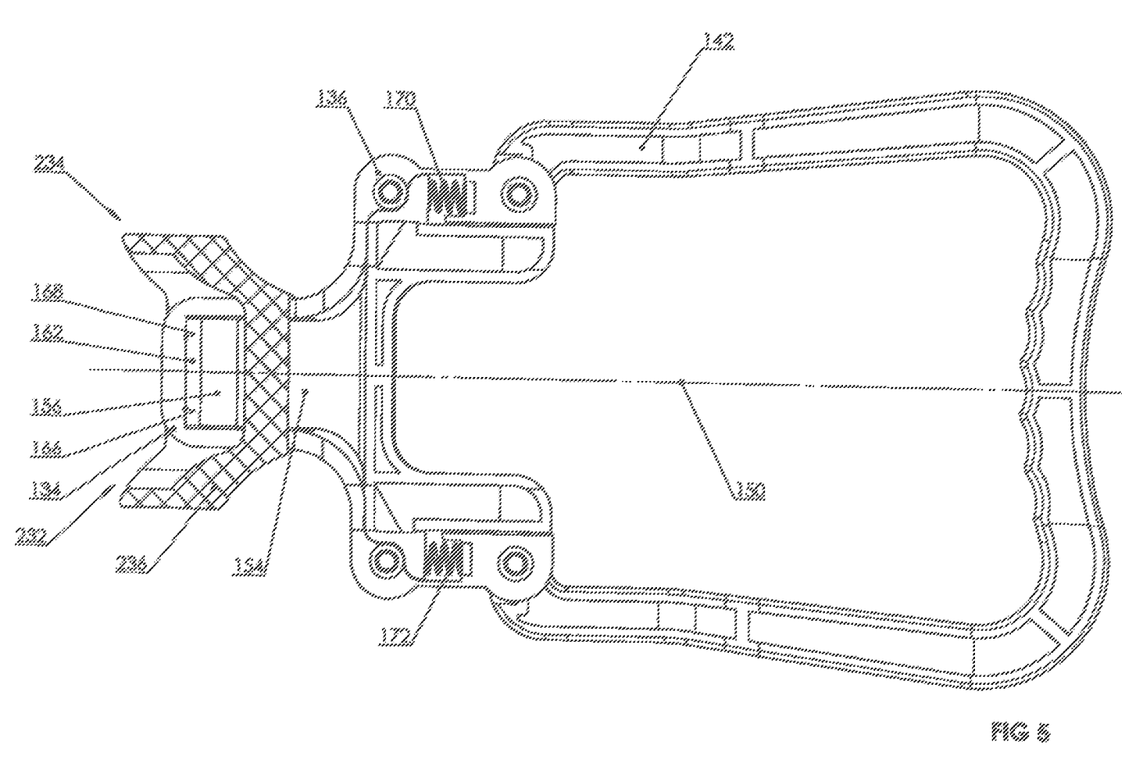
FIG. 5 is a partial view, in partial cross section, of the first and the second part of the locking device, engaged respectively, along a face meant to be turned towards the connectors.

FIG. 5 shows the locking mechanism along a face meant to be turned towards the connectors. On this figure the fastening ring 236 of the latch 234 appears in a partial cross-section.

The first part of the locking mechanism 132 is engaged with the second part of the locking mechanism 232, the bolt 134 being engaged in the latch 234.

One notices that the tongue 154 is integral with the grip 142, whereas it presents freedom of translation in the socket of the bolt, in relation to the end of the bolt especially. Translation occurs along the axis 150 of the bolt. More precisely, the tongue presents freedom of translation between a proximal position, shown on FIGS. 4 and 5, and a distal position shown on FIG. 6. In the proximal position the end 166 of the tongue touches the supporting edge 168 of the bolt and prevents it from bending. Return springs 170, 172 seated between the base element 136 integral with the bolt 134 and a portion of the grip 142 integral with the tongue 154 return and keep the tongue in its proximal position.

Figure 6:
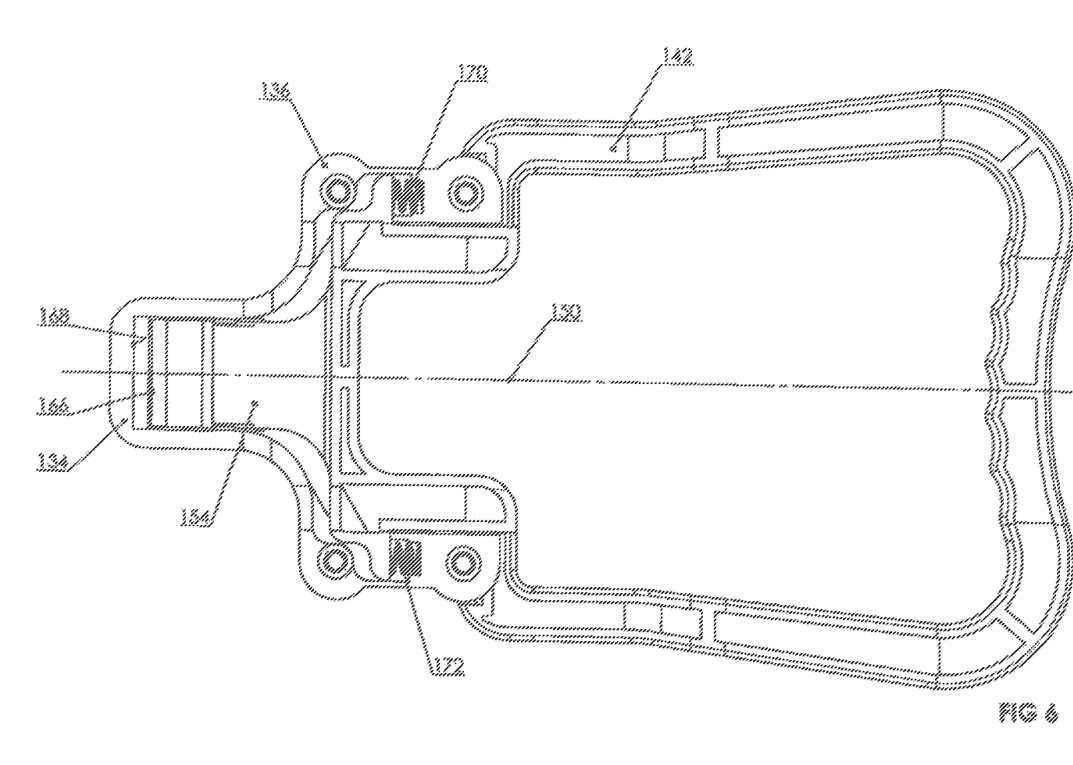
FIG. 6 is a view of the first part of the locking device along a face meant to be turned towards the connectors.
Figure 7:
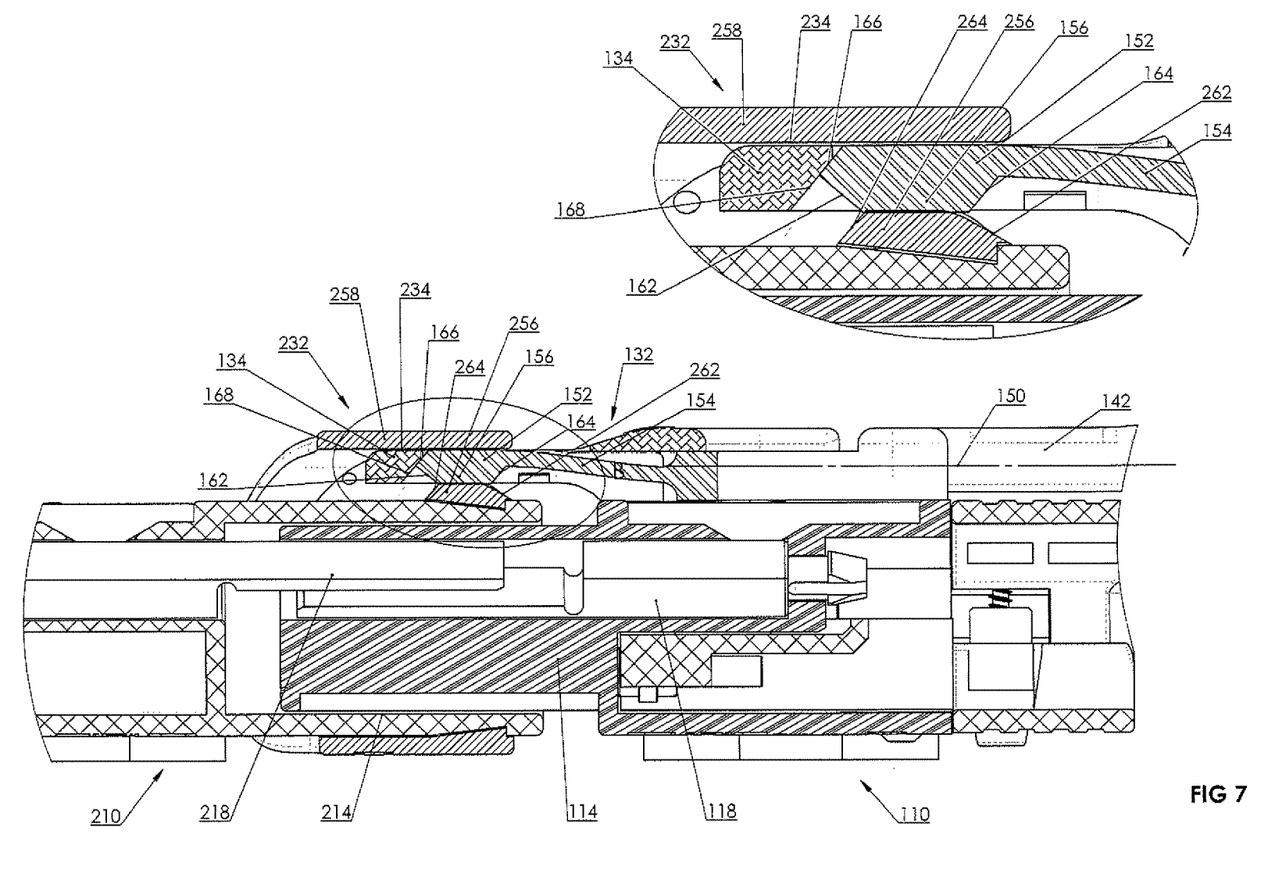
FIG. 7 is a center-line cross section of a part of the connectors and of the locking device.

FIG. 6, which shows only the first part of the locking mechanism, shows the distal position of the tongue 154, in which its end 166 is separated from the conjugated supporting edge 168 of the bolt, and in which bending of the tongue is possible. Displacement of the tongue in the distal position is performed by pulling on the grip 142 in a direction opposite to the end of the bolt 134 while keeping fixed one of either the base element 136 or the first connector or the second connector when it is assembled to the first connector. In effect, when the second connector, and hence the female casing is kept fixed the same pulling action on the grip allows not only to move the tongue 154 into the distal position but also to subsequently withdraw the bolt from the latch, to withdraw the male casing from the female casing and to separate the first and the second connector.

Displacement of the tongue 154 in the distal position enables the displacement of the second locking relief 156 from its protruding position to its retracted position along an axis perpendicular to the plane of FIG. 6. At the time of extraction of the bolt from the latch, the passage of the second relief above the first relief is facilitated by a beveled configuration of the opposing edges 164, 264 of the locking reliefs. This characteristic is visible on FIG. 4.

As also mentioned in reference to FIG. 4, and in a comparable manner, the edges 162 and 262 of the locking reliefs 156, 256 which come into contact at the beginning of the insertion of the bolt 134 into the latch 234, also present a bevel. They can thus serve as an incline for lifting the second relief from its protruding position to the retracted position.

The edges 162, 262 of the locking reliefs do however have another function at the beginning of the insertion of the bolt 134 into the latch 234. This function, when the reliefs come into contact, is to slightly push back the tongue 154 from its proximal position to its distal position. The force necessary for pushing the tongue back comes from the force exerted in order to couple the connectors 110, 210 together. Thus, at the time of engagement of the male casing 112 into the female casing 212 and at the time of the concomitant engagement of the bolt 134 into the latch 234, no action on the grip 142 is necessary to release the tongue 154.

We claim:

1. A locking device for an assembly of electrical connectors in which a first connector is coupled to a second connector, the locking device comprising:
   at least one latch having a bolt passage, the bolt passage having a first locking relief;
   at least one bolt having a section received in the bolt passage of the latch, the bolt passage extending parallel to an axis of the bolt;
   a tongue received in a casing of the bolt, the tongue extending parallel to the axis of the bolt, said tongue being insertable into the latch conjointly with the bolt, the tongue having a second locking relief, said tongue having a flexibility so as to displace the second locking relief between a protruding position on one face of the bolt turned toward the first locking relief when the bolt is inserted into the latch and a retracted position in the casing of the bolt, the second locking relief allowing a passage along the first locking relief in the retracted position when the bolt is inserted into the latch and to occupy the protruding position behind the first locking relief in a direction of inserting of the bolt into the latch when the bolt occupies a locking position in the latch, wherein the tongue and the latch have supporting edges, the tongue having a freedom of translation in the casing of the bolt parallel to the axis of the bolt between a proximal position and a distal position, the supporting edges being in contact so as to inhibit bending of the tongue with a displacement of the second locking relief from the protruding position toward the retracted position.

2. The locking device of claim 1, wherein the supporting edges are separated in the distal position so as to allow a displacement of the second locking relief from the protruding position toward the retracted position.

3. The locking device of claim 1, wherein the proximal position of the tongue is closer to a free end of the bolt than the distal position of the tongue.

4. The locking device of claim 1, further comprising:
   a grip integral with the tongue, said grip adapted to allow a user to move the tongue from the proximal position toward the distal position.

5. The locking device of claim 4, wherein the grip has a median axis of traction defining and angle of between 0 and 20 degrees with the axis of the bolt.

6. The locking device of claim 1, further comprising:
   at least one return spring cooperative with the tongue in the proximal position.

7. The locking device of claim 1, wherein one of the first locking relief and the second locking relief has at least one incline cooperative with another of the first locking relief and the second locking relief and to push the second locking relief from the protruding position toward the retracted position upon insertion of the bolt into the latch or upon withdrawal of the bolt from the latch.

8. The locking device of claim 1, where in the latch is rigidly connected with at least one of the first and second connectors and wherein the bolt is rigidly connected with another of the first and second connectors.

9. The locking device of claim 8, each of the first and second connectors having a casing formed of an electrical insulating material, the casing of the connector having at least one electrical contact, at least one of the casings and the electrical contacts having complementary shapes so as to allow mutual insertion, wherein the bolt and the latch are integral with the casings so as to allow insertion of the bolt into the latch and for withdrawal of the bolt from the latch respectively simultaneously with the mutual insertion or withdrawal of the contact elements of the casings respectively.

10. The locking device of claim 9, wherein the bolt is rigidly connected by screws to the casings of one of the first and second connectors.

11. The locking device of claim 10, where in the latch is rigidly connected by reversible interlocking to the other of the first and second connectors.

* * * * *